United States Patent
Fukui

(10) Patent No.: US 7,835,241 B2
(45) Date of Patent: Nov. 16, 2010

(54) OPTICAL DISC PLAYBACK APPARATUS

(75) Inventor: Toshiaki Fukui, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 490 days.

(21) Appl. No.: 11/935,240

(22) Filed: Nov. 5, 2007

(65) Prior Publication Data
US 2008/0106988 A1    May 8, 2008

(30) Foreign Application Priority Data
Nov. 7, 2006    (JP)    ............... 2006-301752

(51) Int. Cl.
*G11B 7/00*    (2006.01)
(52) U.S. Cl. ............................... 369/53.28
(58) Field of Classification Search ............ None
See application file for complete search history.

(56) References Cited

U.S. PATENT DOCUMENTS

| | | | |
|---|---|---|---|
| 5,477,514 A * | 12/1995 | Watanabe et al. | 369/44.28 |
| 6,061,318 A * | 5/2000 | Hwang | 369/53.23 |
| 6,285,634 B1 * | 9/2001 | Abe et al. | 369/44.11 |
| 6,400,663 B1 * | 6/2002 | Okada et al. | 369/44.29 |
| 6,418,108 B1 * | 7/2002 | Ueda et al. | 369/112.23 |
| 6,430,130 B1 * | 8/2002 | Furukawa | 369/53.19 |
| 6,469,965 B1 * | 10/2002 | Horita | 369/53.2 |
| 7,260,040 B2 * | 8/2007 | Lee | 369/53.2 |
| 2005/0068873 A1 * | 3/2005 | Chung | 369/53.23 |

FOREIGN PATENT DOCUMENTS

| | | | |
|---|---|---|---|
| JP | 05054406 A | * | 3/1993 |
| JP | 2004-192784 | | 7/2004 |
| JP | 2006-134367 | | 5/2006 |

OTHER PUBLICATIONS

Patent Abstracts of Japan for Japanese Publication No. 2006-134367, Publication date May 25, 2006 (1 page).
Patent Abstracts of Japan for Japanese Publication No. 2004-192784, Publication date Jul. 8, 2004 (1 page).

* cited by examiner

*Primary Examiner*—Peter Vincent Agustin
(74) *Attorney, Agent, or Firm*—Osha Liang LLP

(57) ABSTRACT

An optical disc playback apparatus with which collision of a lens and an optical disc is avoided is provided. Processes executed by a microcomputer of the optical disc playback apparatus when a disc is played back include: the step of outputting a signal for performing focus search at a predetermined speed; the step of outputting a signal for reducing search speed when reflection of laser light from a surface of the optical disc is detected; and the step of outputting a signal for indicating disc error when S-shape is not detected and a certain time has elapsed since the detection of the reflection.

18 Claims, 5 Drawing Sheets

OPTICAL DISC PLAYBACK APPARATUS

BACKGROUND OF THE INVENTION

1. Field of the Invention

The present invention relates to an optical disc playback apparatus, and particularly, to control of a pickup unit for reading data from an optical disc.

2. Description of the Background Art

As media for recording data, DVDs (Digital Versatile Discs), BDs (Blu-Ray Discs), and other optical discs are known. The data recorded on an optical disc is read by a pickup apparatus that emits laser light. In order to read data recorded on the optical disc, it is necessary to condense the laser light so that the light is applied as focused on a data recording surface of the optical disc. To this end, an objective lens constituting the pickup apparatus is moved in the focusing direction of the optical disc.

On the other hand, what is called a working distance in playing back a BD (about 0.5 mm), for example, is shorter than a working distance in playing back a DVD (about 1.5 mm), and therefore the lens and the optical disc may collide. A working distance herein refers to the distance between the objective lens and the surface of the optical disc when the focus is attained at the data recording layer of the optical disc.

For example, Japanese Patent Laying-Open No. 2004-192784 discloses a technique of realizing precise focus jump while avoiding collision of an optical disc and a focusing lens.

Japanese Patent Laying-Open No. 2006-134367 discloses a technique of avoiding contact between an objective lens and a disc surface in discriminating an optical disc.

Japanese Patent Laying-Open Nos. 2004-192784 and 2006-134367 both disclose that what is called an S-shape curve is employed in controlling movement of the lens. However, if the S-shape curve is not detected, the movement of the lens is not controlled and thus the lens may possibly collide with the optical disc.

SUMMARY OF THE INVENTION

The present invention has been made to solve the above-described problem, and an object thereof is to provide an optical disc playback apparatus with which collision of an optical disc and a pickup apparatus is avoided.

In summary, in order to solve the above-described problem, in accordance with one aspect of the present invention, an optical disc playback apparatus for playing back an optical disc is provided. The optical disc playback apparatus includes: a light emitting unit configured to irradiate the optical disc with light; a light condensing unit configured to condense reflected light from the optical disc; a driving unit configured to drive the light condensing unit in a focusing direction; a calculating circuit configured to calculate strength of a signal based on the reflected light condensed by the light condensing unit; a first detecting circuit configured to detect a first change in the strength; a second detecting circuit configured to detect a second change in the strength after the first change is detected; a playback unit configured to play back the optical disc when the second change is detected within a predetermined time; and a stopping circuit configured to stop the driving unit when the second change is not detected within the predetermined time.

An optical disc playback apparatus according to another aspect of the present invention includes: a light emitting unit configured to irradiate the optical disc with light; a light condensing unit configured to condense reflected light from the optical disc; a driving unit configured to drive the light condensing unit in a focusing direction; a memory configured to store a set of instructions; and a processor configured to execute the instructions. The processor executes: a calculating instruction for calculating strength of a signal based on the reflected light condensed by the light condensing unit; a first detecting instruction for detecting a first change in the strength; a second detecting instruction for detecting a second change in the strength after the first change is detected; a playback instruction for playing back the optical disc when the second change is detected within a predetermined time; and a stopping instruction for stopping the driving unit when the second change is not detected within the predetermined time.

With the optical disc playback apparatus according to the present invention, collision of the optical disc and the pickup apparatus is avoided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
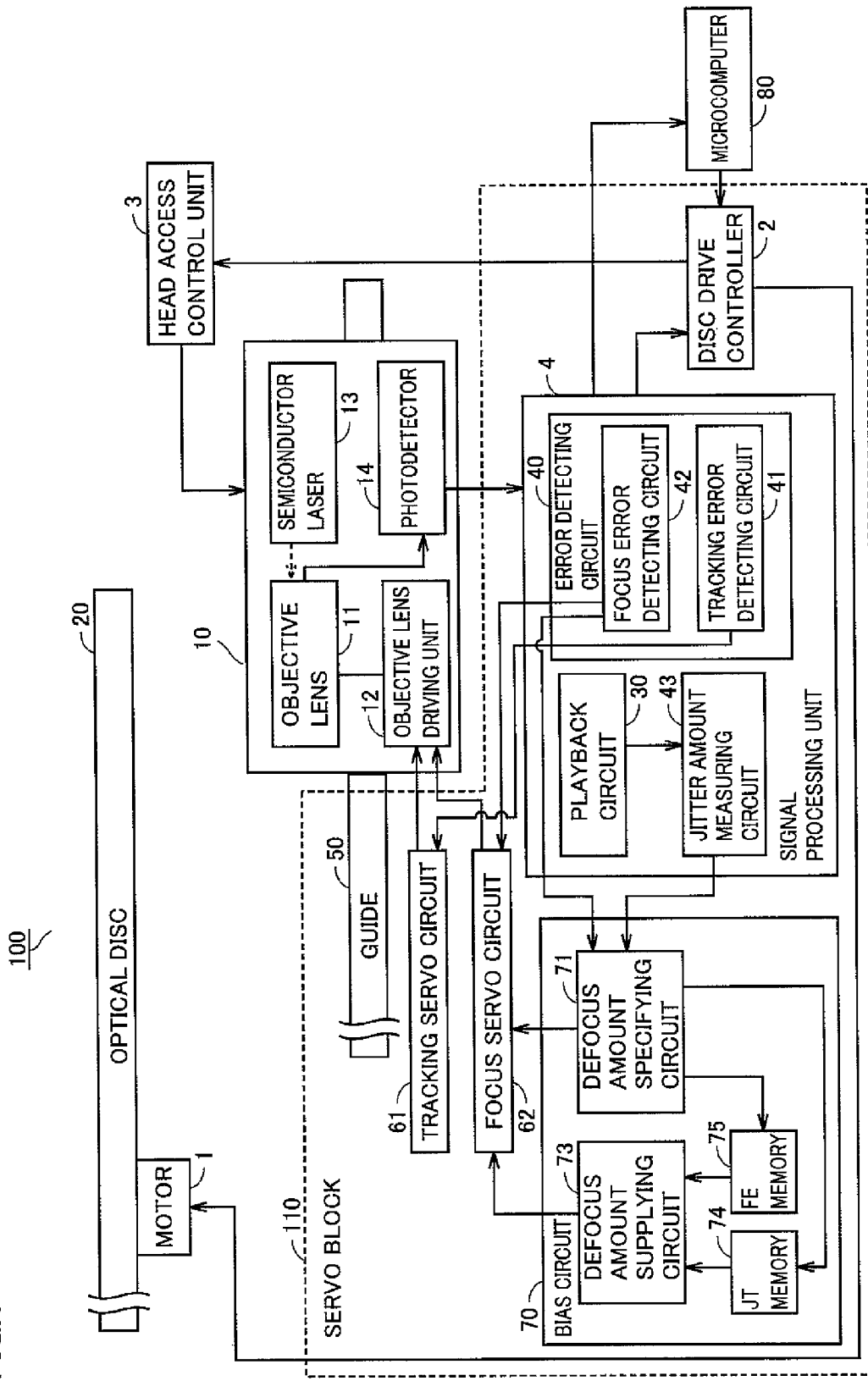
FIG. 1 is a block diagram showing a hardware configuration of an optical disc playback apparatus 100 according to an embodiment of the present invention.

In the following, referring to the drawings, an embodiment of the present invention is described. In the following description, the same components are denoted by the same reference characters. Their labels and functions are also the same. Accordingly, detailed description thereof will not be repeated.

Referring to FIG. 1, a configuration of an optical disc playback apparatus 100 according to an embodiment of the present invention is described. FIG. 1 is a block diagram showing a hardware configuration of optical disc playback apparatus 100. Optical disc playback apparatus 100 includes a motor 1 driving an optical disc 20, a disc drive controller 2, a head access control unit 3, a pickup apparatus 10, a microcomputer 80, and a servo block 110. Optical disc 20 is, for example, a BD (Blu-ray Disc), and it may be other discs that can be read by means of an optical signal.

Servo block 110 includes a signal processing unit 4, a guide 50, a tracking servo circuit 61, a focus servo circuit 62, and a bias circuit 70.

Pickup apparatus 10 includes an objective lens 11, an objective lens driving apparatus 12, a semiconductor laser 13, and a photodetector 14. Signal processing unit 4 includes a playback circuit 30, an error detecting circuit 40, and a jitter amount measuring circuit 43.

Error detecting circuit 40 includes a focus error detecting circuit 42 and a tracking error detecting circuit 41. Bias circuit 70 includes a defocus amount specifying circuit 71, a defocus amount supplying circuit 73, a JT memory 74, and an FE memory 75.

Motor 1 receives a signal supplied from disc drive controller 2, and based on the signal, rotates optical disc 20 at a prescribed speed.

Pickup apparatus 10 is controlled by head access control unit 3, and driven in a radial direction of optical disc 20 along guide 50.

In pickup apparatus 10, objective lens driving apparatus 12 drives objective lens 11 based on a control signal applied to pickup apparatus 10. Specifically, objective lens driving apparatus 12 includes a magnet and coils. Under control of focus servo circuit 62, objective lens driving apparatus 12 allows current to flow through a focus coil arranged in a magnetic field generated from the magnet and thereby drives objective lens 11 in a focusing direction. Further, under control of tracking servo circuit 61, objective lens driving apparatus 12 allows current to flow through a tracking coil arranged in a magnetic field generated from the magnet and thereby drives objective lens 11 in a tracking direction.

Semiconductor laser 13 outputs an optical signal for reading data written on optical disc 20. Objective lens 11 condenses the laser light output from semiconductor laser 13 and applies the light to a recording surface of optical disc 20, and condenses reflected light from the recording surface of optical disc 20. It is also possible to employ a lens for applying the light to optical disc 20 and a separate lens for condensing the reflected light from optical disc 20.

The reflected light condensed by objective lens 11 is input to photodetector 14. Photodetector 14 converts the optical signal into an electric signal. Photodetector 14 has four light receiving areas, for example. The output from photodetector 14 is input to signal processing unit 4.

In signal processing unit 4, playback circuit 30 detects the reflected light being input to objective lens 11, and outputs a signal for playing back data recorded on the recording surface of optical disc 20. Jitter amount measuring circuit 43 calculates a jitter amount of the signal output from playback circuit 30.

In error detecting circuit 40, tracking error detecting circuit 41 detects shift of a holder (not shown) of objective lens 11 in the tracking direction (i.e., shift in the radial direction of optical disc 20) based on the reflected light being input to objective lens 11, and generates a tracking error signal based on the shift.

Focus error detecting circuit 42 detects shift of the holder in the focusing direction (shift of the optical axis of the laser light output from semiconductor laser 13) based on the reflected light being input to objective lens 11 based on the astigmatism method, and generates a focus error signal based on the shift.

Tracking servo circuit 61 controls tracking of objective lens 11 performed by objective lens driving apparatus 12, based on the tracking error signal transmitted from tracking error detecting circuit 41. Tracking servo circuit 61 performs tracking control when a jitter minimum defocus amount JMDF is specified in a period after insertion of optical disc 20 into optical disc playback apparatus 100 and before a seek operation, and after the seek operation ends (tracking servo on). Tracking servo circuit 61 stops tracking control when a focus error minimum defocus amount FMDF is specified in a period after insertion of optical disc 20 and before the seek operation, and during the seek operation (tracking servo off).

Focus servo circuit 62 controls focusing of objective lens 11 performed by objective lens driving apparatus 12 based on the sum of the focus error signal transmitted from focus error detecting circuit 42 and the defocus amount transmitted from bias circuit 70. Focus servo circuit 62 performs focus control after insertion of optical disc 20 into optical disc playback apparatus 100 (focus servo on) and stops focus control after ejection of optical disc 20 from optical disc playback apparatus 100 (focus servo off).

In bias circuit 70, defocus amount specifying circuit 71 changes the defocus amount by a prescribed amount in a state in which tracking servo is on and focus servo is on, and outputs the changed defocus amount to focus servo circuit 62. Under the focus control performed based on the changed defocus amount, defocus amount specifying circuit 71 obtains a changed jitter amount from jitter amount measuring circuit 43. Defocus amount specifying circuit 71 specifies a defocus amount by which the magnitude of the jitter amount becomes minimum, and writes it to JT memory 74 as jitter minimum defocus amount JMDF.

Defocus amount specifying circuit 71 successively changes the defocus amount by a prescribed amount in a state in which tracking servo is off and focus servo is on, and outputs it to focus servo circuit 62. Defocus amount specifying circuit 71 obtains a focus error signal, which has been changed by the focus control based on the changed defocus amount, from focus error detecting circuit 42. Defocus amount specifying circuit 71 specifies a defocus amount by which the amplitude of the focus error signal becomes minimum, and writes it to FE memory 75 as a focus error minimum defocus amount FMDF.

JT memory 74 stores jitter minimum defocus amount JMDF in a memory area reserved for control. FE memory 75 stores focus error minimum defocus amount FMDF in another memory area. It is noted that JT memory 74 and FE memory 75 may physically be the same memory.

During a seek operation, defocus amount supplying circuit 73 reads from the memory area focus error minimum defocus amount FMDF stored in FE memory 75, and provides the value to focus servo circuit 62. When the seek operation ends, defocus amount supplying circuit 73 reads from the memory area jitter minimum defocus amount JMDF stored in JT memory 74, and provides the value to focus servo circuit 62.

Figure 3:
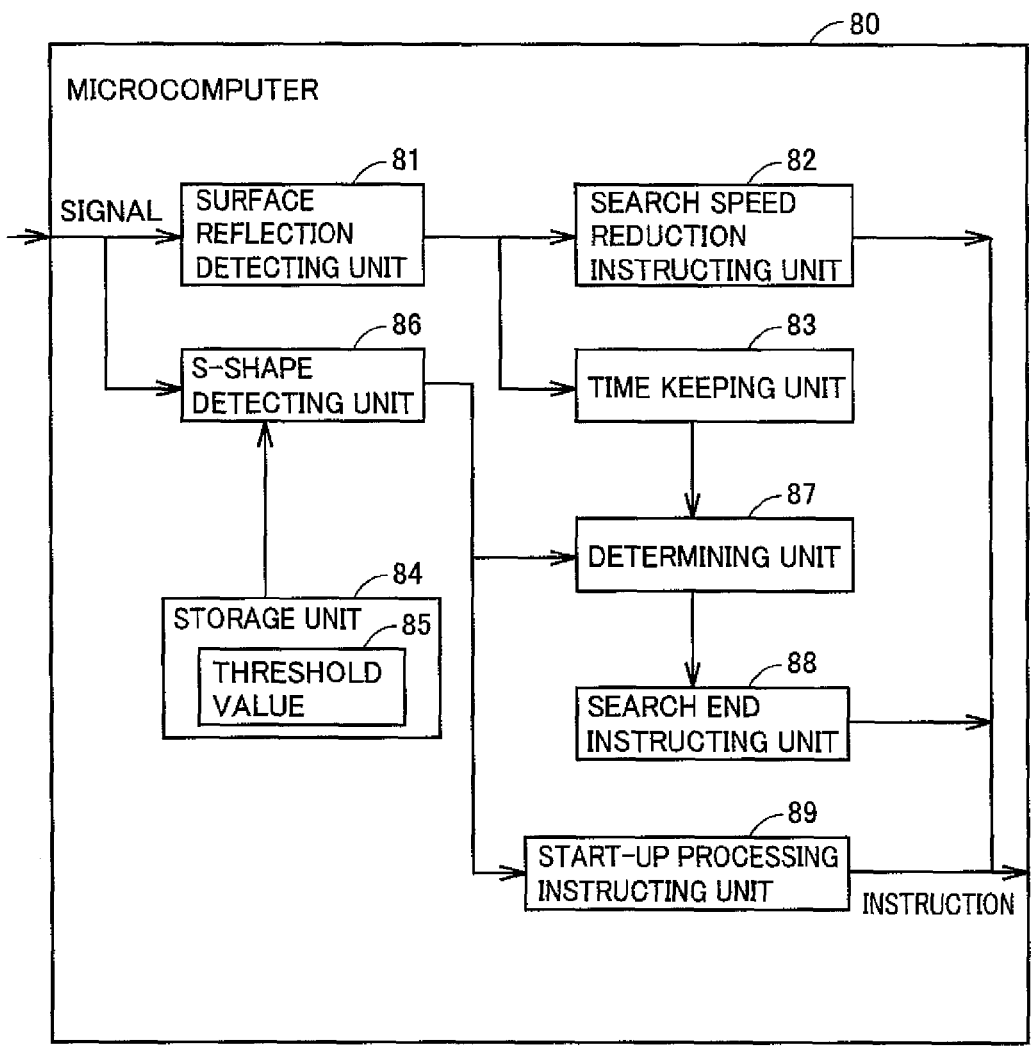
FIG. 3 is a block diagram showing functions realized by a microcomputer 80 included in optical disc playback apparatus 100.

Microcomputer 80 performs signal processing for controlling movement of pickup apparatus 10 based on the signal output from signal processing unit 4, and outputs the result to disc drive controller 2. The functions realized by microcomputer 80 will be described later (FIG. 3).

Figure 2:
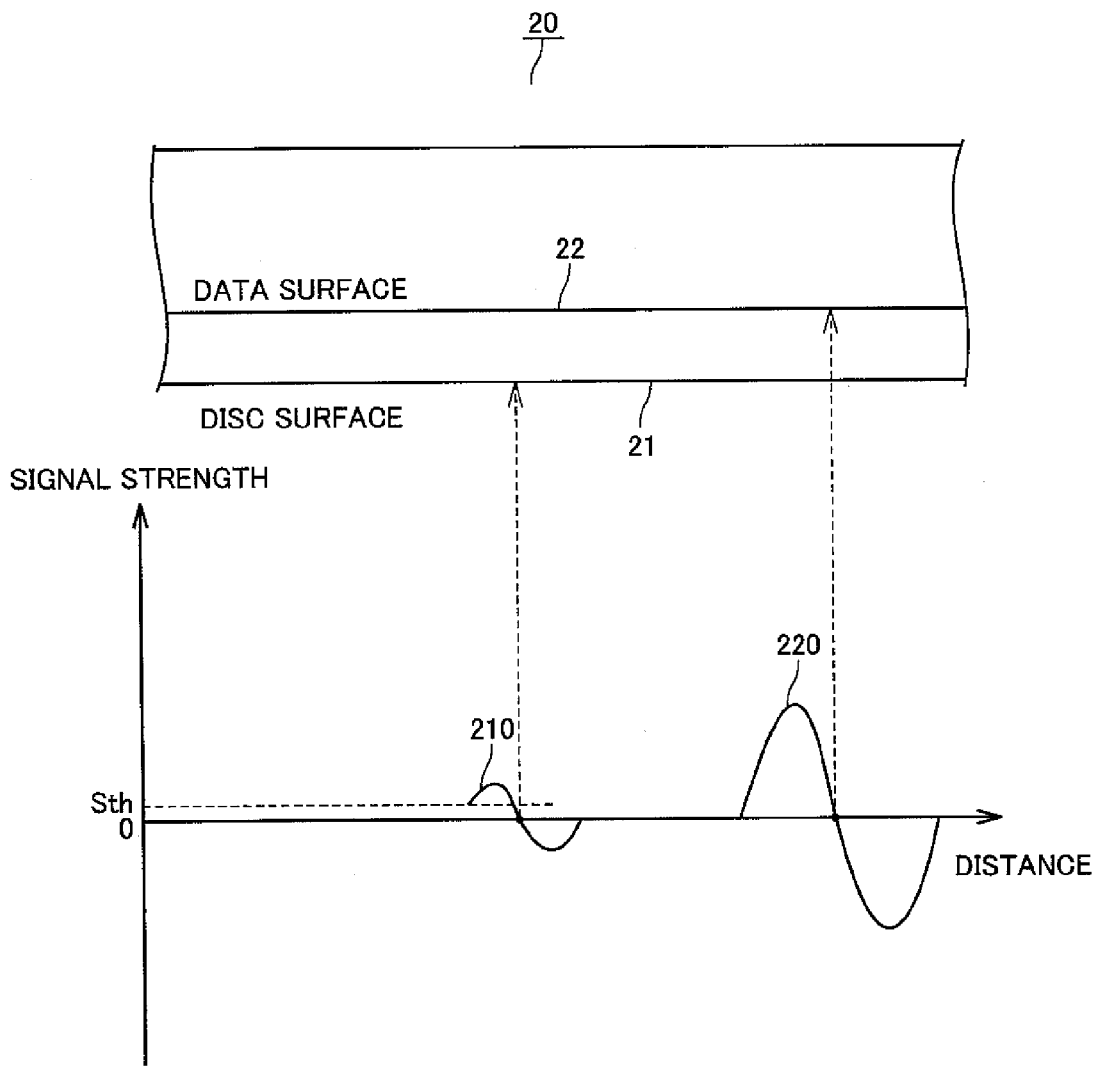
FIG. 2 shows, in association with each other, the cross section of an optical disc 20 and the transition of signal strength detected based on light from a reflection surface of optical disc 20.

Referring to FIG. 2, changes in signal strength based on reflected light from optical disc 20 will be described. FIG. 2 shows, in association with each other, the cross section of optical disc 20 and the transition of signal strength based on light from a reflection surface of optical disc 20. The signal strength changes in accordance with the distance between optical disc 20 and objective lens 11.

Optical disc 20 includes a disc surface 21 and a data surface 22. Disc surface 21 protects data surface 22. Data surface 22 records data.

When laser light is emitted to optical disc 20, the reflected light from optical disc 20 is condensed by objective lens 11. A signal representing the relationship between objective lens 11 and optical lens 20 (focus error signal) is generated based on the reflected light, which can be represented by graph 210 in FIG. 2. At the position shown by graph 210, when objective lens 11 further approaches optical disc 20, the reflected light from data surface 22 is input to objective lens 11. The strength of optical signal sensed based on the reflected light is represented by, for example, graph 220. In this case, the peak of graph 220 exceeds that of graph 210.

On the other hand, while the laser light is applied between disc surface 21 and data surface 22, the value of the strength obtained based on the reflected light from optical disc 20 is approximately 0. Calculating the signal strength based on the reflected light ahead and behind the position, what is called an "S-shape curve" is derived as shown in FIG. 2.

Next, referring to FIG. 3, microcomputer 80 included in optical disc playback apparatus 100 is described. FIG. 3 is a block diagram showing functions realized by microcomputer 80. Microcomputer 80 includes a surface reflection detecting unit 81, a search speed reduction instructing unit 82, a time keeping unit 83, a storage unit 84, an S-shape detecting unit 86, a determining unit 87, a search end instructing unit 88, and a start-up processing instructing unit 89. Storage unit 84 stores a preset threshold value 85.

The signal transmitted from signal processing unit 4 is input to surface reflection detecting unit 81 or S-shape detecting unit 86. Based on the signal, surface reflection detecting unit 81 detects that the laser light output from semiconductor laser 13 reflects from disc surface 21 of optical disc 20.

Based on surface reflection detecting unit 81 detecting reflection from disc surface 21, search speed reduction instructing unit 82 generates an instruction for reducing the moving speed of objective lens 11. Search speed reduction instructing unit 82 sends the instruction to disc drive controller 2. In response to the instruction, disc drive controller 2 instructs head access control unit 3 to reduce the moving speed of objective lens 11 toward optical disc 20. The instruction is sent to objective lens driving apparatus 12. In response to the instruction, objective lens driving apparatus 12 changes its output (for example, a signal defining a voltage value applied to an actuator) so that the speed of objective lens 11 moving toward optical disc 20 is reduced.

Time keeping unit 83 obtains time information in microcomputer 80. For example, time keeping unit 83 keeps the time elapsed since the reflection from disc surface 21 is detected by surface reflection detecting unit 81. The result is provided to determining unit 87.

Storage unit 84 stores threshold value 85 for detecting changes in the signal strength based on the reflected light by S-shape detecting unit 86. Threshold value 85 is written to storage unit 84 with other data or programs when optical disc playback apparatus 100 is manufactured, for example.

S-shape detecting unit 86 is configured to operate based on the output from signal processing unit 4 and threshold value 85 stored in storage unit 84. Specifically, S-shape detecting unit 86 determines whether or not the focus error signal output from signal processing unit 4 exceeds preset threshold value 85. Based on the change in the focus error signal relative to threshold value 85, S-shape detecting unit 86 detects a change in the signal strength of the reflected light from optical disc 20 (for example, a change on a sine curve). The change includes a change in the rate of change in the signal strength (the rate of change changing from positive to negative, or vice versa). The result of detection by S-shape detecting unit 86 is sent to determining unit 87 or a start-up processing instructing unit 89.

Determining unit 87, in one aspect, determines whether or not to end the focus search based on the time information from time keeping unit 83 and the detection result from S-shape detecting unit 86. For example, when it is detected that the time kept by time keeping unit 83 (for example, the time elapsed since the reflection from disc surface 21 is detected) has elapsed for a predetermined time, determination unit 87 determines to end the focus search by the movement of objecting lens driving apparatus 12. On the other hand, when determining unit 87 determines that such time has not been elapsed yet, it determines to continue the detection by S-shape detecting unit 86.

Based on the result of determination by determining unit 87, search end instructing unit 88 generates an instruction for ending the focus search by objective lens driving apparatus 12, and provides the generated instruction to disc drive controller 2. Based on the instruction, disc drive controller 2 ends the driving operation of objective lens driving apparatus 12 through head access control unit 8.

Start-up processing instructing unit 89 provides disc drive controller 2 with an instruction for performing processing for optical disc playback apparatus 100 to play back optical disc 20. Specifically, when a change (graph 220) in the signal strength based on the reflected light from data surface 22 is detected by S-shape detecting unit 86, start-up processing instructing unit 89 provides a standby instruction to disc drive controller 2 so that data recorded on optical disc 20 can be read. In response to the standby instruction, optical disc reproducing apparatus 100 switches to a state for accepting the next signal from an external source.

Figure 4:
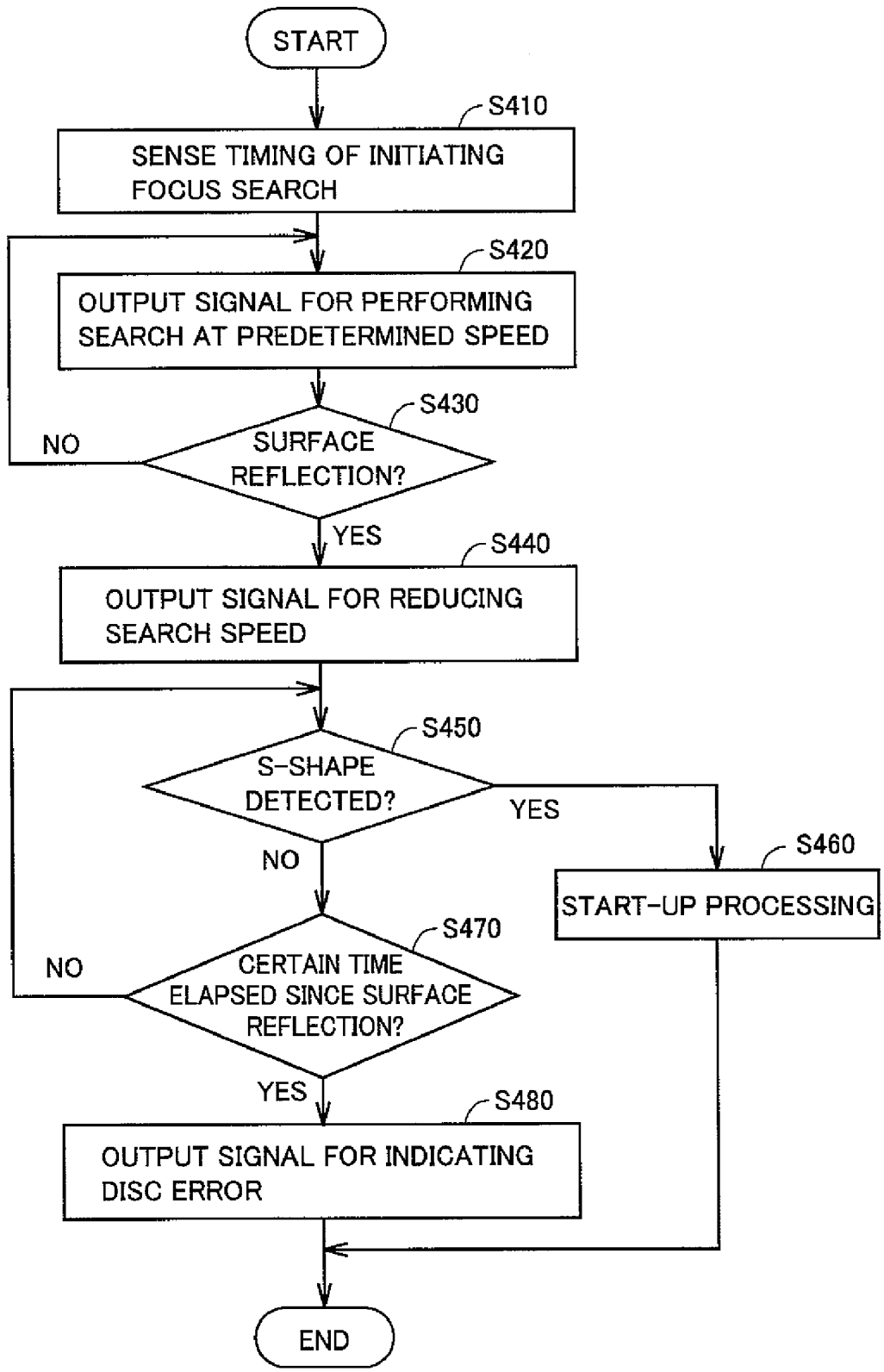
FIG. 4 is a flowchart showing a series of operations executed by microcomputer 80.

Next, referring to FIG. 4, a control structure of optical disc playback apparatus 100 is described. FIG. 4 is a flowchart showing a series of operations executed by microcomputer 80.

In step S410, microcomputer 80 senses that it is a timing to initiate a focus search to optical disc 20. The sensing is performed after an initial operation is completed, which is carried out after optical disc 20 is inserted into optical disc playback apparatus 100. The initial operation includes, for example, reading the type or other properties of the disc from a data management area of optical disc 20.

In step S420, microcomputer 80 drives objective lens driving apparatus 12 at a predetermined speed, and provides a signal for performing the focus search to disc drive controller 2. Based on the signal, disc drive controller 2 drives objective lens driving apparatus 12 at a constant speed through head access control unit 3. Under the control of objective lens driving apparatus 12, objective lens 11 approaches at a constant speed to the focusing direction of optical disc 20.

In step S430, based on the output from signal processing unit 4, microcomputer 80 determines whether or not reflection from disc surface 21 of optical disc 20 is detected. When microcomputer 80 determines that the reflection from disc surface 21 is detected (YES in step S430), the control goes to step S440. Otherwise (NO in step S430), the control goes back to step S420.

In step S440, microcomputer 80 provides a signal for reducing the speed of the focus search to disc drive controller 2. Based on the signal, disc drive controller 2 reduces, through head access control unit 3, the speed of moving objective lens 11 by objective lens driving apparatus 12.

In step S450, based on the signal output from signal processing unit 4, microcomputer 80 determines whether or not S-shape (the shape indicative of a change in the signal strength) is detected. When microcomputer 80 determines that S-shape is detected (YES in step S450), the control is switched to step S460. Otherwise (NO in step S450), the control goes to step S470.

In step S460, microcomputer 80 provides an instruction for carrying out a predetermined start-up processing for optical disc playback apparatus 100 to disc drive controller 2. In response to the instruction, disc drive controller 2 sets each unit to stand by for reading data from the data surface of optical disc 20.

In step S470, microcomputer 80 determines whether or not a predetermined certain time has elapsed since the reflection from disc surface 21 is detected, based on time information internally generated. Here, the certain time is defined based on the distance between objective lens 11 and optical disc 20 when the surface reflection is detected (step S430), and on the moving speed of objective lens 11 thereafter. When microcomputer 80 determines that the certain time has elapsed (YES in step S470), microcomputer 80 switches the control to step 8480. Otherwise (NO in step S470), microcomputer 80 returns the control to step S450.

In step S480, microcomputer 80 provides an instruction for stopping objective lens 11 to head access control unit 3. In response to the instruction, head access control unit 3 instructs pickup apparatus 10 so that objective lens 11 does not further approach optical disc 20. In response to the instruction, a voltage value applied to objective lens driving apparatus 12 is maintained at a constant value, whereby objective lens 11 stays at the position. As a result, collision of objective lens 11 and optical disc 20 is avoided.

Further, microcomputer 80 generates a signal for indicating a disc error and provides it to a display unit (not shown) of optical disc playback apparatus 100. Thus, the user of optical disc playback apparatus 100 can recognize that playback of optical disc 20 has failed.

It is noted that the error processing by microcomputer 80 in step S480 may not be performed immediately after the certain time has elapsed since the detection of the surface reflection. For example, data reading operations may be performed for a preset times at the position where objective lens 11 is stopped. When a focus error accidentally occurred, an additional reading operation allows data to be correctly read from optical disc 20.

Figure 5:
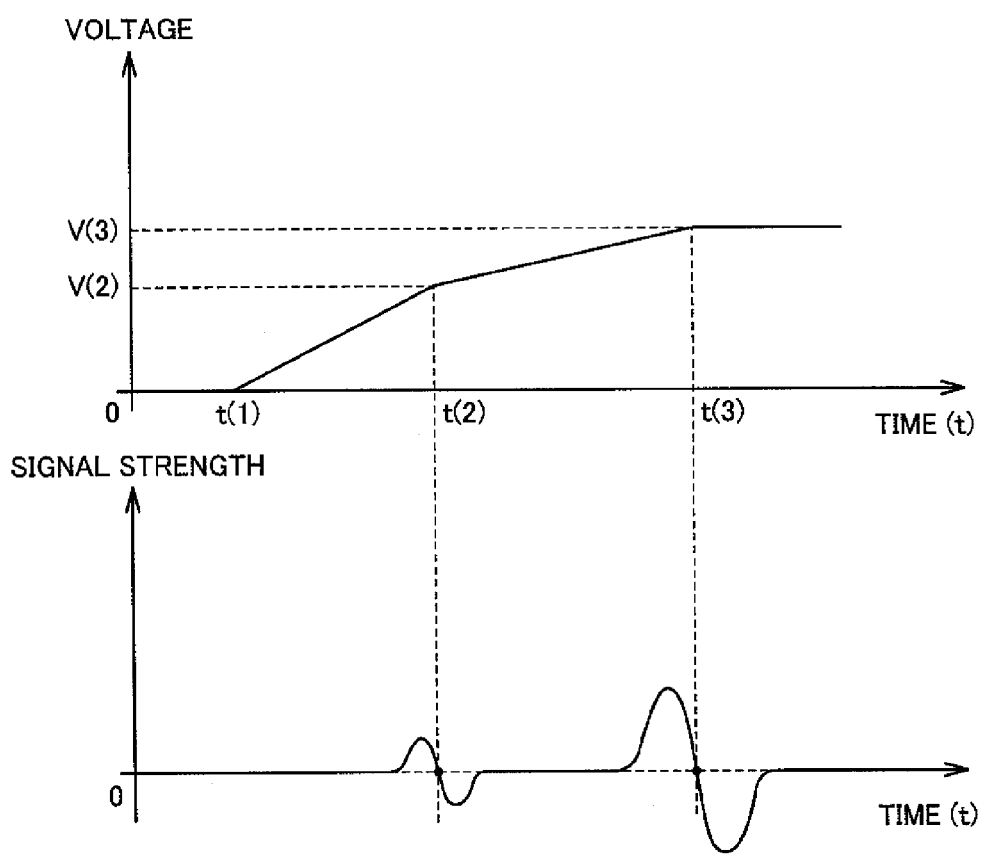
FIG. 5 shows a signal (voltage value) applied to an objective lens driving apparatus 12 included in optical disc playback apparatus 100, as well as changes in the signal strength based on reflected light from optical disc 20.

Next, referring to FIG. 5, the relationship between movement of objective lens 11 and reflected light is described. FIG. 5 shows a signal (voltage value) applied to objective lens driving apparatus 12, as well as changes in the signal strength based on reflected light from optical disc 20.

After optical disc 20 is attached to optical disc playback apparatus 100 and a prescribed initial operation is completed, at time point t(1), a timing for starting a focus search is sensed (step S410). A signal (for example, a voltage value) for moving the holder (not shown) of objective lens 11 by objective lens driving apparatus 12 is provided. For example, the voltage value is provided to the holder in accordance with a constant rate of change, so that the voltage value transits from 0 to V(2) from time point t(1) to time point t(2). The holder is connected to an actuator, for example. When the actuator drives based on the voltage value, objective lens 11 approaches optical disc 20. As objective lens 11 approaches optical disc 20, the signal strength calculated based on the reflected light from optical disc 20 becomes gradually greater. The signal strength becomes 0 again at time point t(2), and thereafter the value of the signal strength becomes negative.

At time point t(2), when the first change (the small S-shape) is detected (YES in step S430), microcomputer 80 provides an instruction for reducing the moving speed of objective lens 11 to disc drive controller 2. In response to the instruction, disc drive controller 2 provides a signal for reducing the moving speed to head access control unit 3. In response to the signal, head access control unit 3 provides an instruction to objective lens driving apparatus 12 to output a voltage value defined by an increase rate which is smaller than the increase rate until time point t(2). As a result, after time point t(2), the moving speed of objective lens 11 becomes slower than before.

Thereafter, the signal strength calculated based on the reflected light from optical disc 20 transits from the negative value to 0 again. As objective lens 11 further approaches optical disc 20, a positive value is calculated. After the signal strength value passes its peak and again reaches 0 (time point t(3)), microcomputer 80 determines that the reflection from data surface 22 of optical disc 20 is detected (YES in step S450).

Then, in order to stop further approach of objective lens 11, microcomputer 80 provides an instruction for ending the focus search to disc drive controller 2. Based on the instruction, disc drive controller 2 stops moving objective lens 11 through head access control unit 3.

As above, when a focus search is performed by pickup apparatus 10, optical disc playback apparatus 100 according to the embodiment of the present invention detects the first "S-shape curve" as to the signal strength, and reduces the speed of moving objective lens 1. Further, optical disc playback apparatus 100 keeps the elapsed time since the timing of detection.

When the next "S-shape curve" is not detected before the time elapses a predetermined time, microcomputer 80 of optical disc playback apparatus 100 determines that the focus search to data surface 22 has failed, and stops moving pickup apparatus 10. Thus, even when S-shape curve related to the focus to data surface 22 is not detected, collision of objective lens 11 and optical disc 20 is avoided.

It is noted that the application of the technical idea according to the present invention as described above is not limited to BDs. It is also applicable to other optical discs where what is called a working distance is shorter than in BDs. The manner of presetting the time between the detection of "S-shape curve" based on the reflected light from disc surface 21 and the detection of "S-shape curve" based on the reflected light from data surface 22 is also applicable to presetting the time between each detection of "S-shape curve" based on reflected light from adjacent data surface in an optical disc having a plurality of recording layers.

The present invention is applicable to an apparatus that plays back and/or records on a Blu-Ray Disc and other optical discs having a plurality of reflection surface.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An optical disc playback apparatus for playing back an optical disc, comprising:
   a light emitting unit configured to irradiate said optical disc with light;
   a light condensing unit configured to condense reflected light from said optical disc;
   a driving unit configured to drive said light condensing unit in a focusing direction;
   a calculating circuit configured to calculate strength of a signal based on said reflected light condensed by said light condensing unit;
   a first detecting circuit configured to detect a first change in said strength;
   a second detecting circuit configured to detect a second change in said strength after said first change is detected;

a playback unit configured to play back said optical disc when said second change is detected within a predetermined time; and a stopping circuit configured to stop said driving unit when said second change is not detected within said predetermined time, wherein said predetermined time is defined in accordance with a distance between said light condensing unit and a surface of said optical disc when said first change is detected, and with moving speed of said light condensing unit.

2. The optical disc playback apparatus according to claim 1, wherein said first detecting circuit detects, as said first change, a cyclic change in said strength.

3. The optical disc playback apparatus according to claim 1, wherein said first detecting circuit detects said first change based on the reflected light from a surface of said optical disc.

4. The optical disc playback apparatus according to claim 1, wherein said second detecting circuit detects, as said second change, a cyclic change in said strength.

5. The optical disc playback apparatus according to claim 1, wherein said second detecting circuit detects said second change based on the reflected light from a surface of said optical disc.

6. The optical disc playback apparatus according to claim 1, wherein said calculating circuit includes a generating circuit configured to generate a focus error signal based on the reflected light, and a strength calculating circuit configured to calculate strength of said focus error signal.

7. The optical disc playback apparatus according to claim 6, wherein the strength of said focus error signal sinusoidally changes, said first detecting circuit detects, as said first change, a timing where a value of said strength transits from positive to negative, and said second detecting circuit detects, as said second change, a timing where a value of said strength transits from positive to negative.

8. The optical disc playback apparatus according to claim 1, further comprising a braking circuit configured to cause, in response to the detection of said first change, said driving unit to reduce moving speed of said light condensing unit.

9. The optical disc playback apparatus according to claim 8, wherein said braking circuit provides said driving unit with an instruction for reducing said moving speed in accordance with a predetermined acceleration rate.

10. An optical disc playback apparatus for playing back an optical disc, comprising:
    a light emitting unit configured to irradiate said optical disc with light;
    a light condensing unit configured to condense reflected light from said optical disc;
    a driving unit configured to drive said light condensing unit in a focusing direction;
    a memory configured to store a set of instructions; and
    a processor configured to execute the instructions, wherein said processor executes a calculating instruction for calculating strength of a signal based on said reflected light condensed by said light condensing unit, a first detecting instruction for detecting a first change in said strength, a second detecting instruction for detecting a second change in said strength after said first change is detected, a playback instruction for playing back said optical disc when said second change is detected within a predetermined time, and a stopping instruction for stopping said driving unit when said second change is not detected within said predetermined time,
    wherein said predetermined time is defined in accordance with a distance between said light condensing unit and a surface of said optical disc when said first change is detected, and with moving speed of said light condensing unit.

11. The optical disc playback apparatus according to claim 10, wherein said processor executes, as said first detecting instruction, an instruction for detecting, as said first change, a cyclic change in said strength.

12. The optical disc playback apparatus according to claim 10, wherein said processor executes, as said first detecting instruction, an instruction for detecting said first change based on the reflected light from a surface of said optical disc.

13. The optical disc playback apparatus according to claim 10, wherein said processor executes, as said second detecting instruction, an instruction for detecting, as said second change, a cyclic change in said strength.

14. The optical disc playback apparatus according to claim 10, wherein said processor executes, as said second detecting instruction, an instruction for detecting said second change based on the reflected light from a surface of said optical disc.

15. The optical disc playback apparatus according to claim 10, wherein said processor executes, as said calculating instruction, a generating instruction for generating a focus error signal based on the reflected light, and a strength calculating instruction for calculating strength of said focus error signal.

16. The optical disc playback apparatus according to claim 15, wherein the strength of said focus error signal sinusoidally changes, said processor executes as said first detecting instruction, an instruction for detecting, as said first change, a timing where a value of said strength transits from positive to negative, and as second detecting instruction, an instruction for detecting, as said second change, a timing where a value of said strength transits from positive to negative.

17. The optical disc playback apparatus according to claim 10, wherein said processor further executes a braking instruction for causing, in response to the detection of said first change, said driving unit to reduce moving speed of said light condensing unit.

18. The optical disc playback apparatus according to claim 17, wherein said processor further executes an instruction for providing said driving unit with an instruction for reducing said moving speed in accordance with a predetermined acceleration rate.

* * * * *